(12) United States Patent
Kraft et al.

(10) Patent No.: US 11,557,150 B2
(45) Date of Patent: Jan. 17, 2023

(54) GESTURE CONTROL FOR COMMUNICATION WITH AN AUTONOMOUS VEHICLE ON THE BASIS OF A SIMPLE 2D CAMERA

(71) Applicant: Conti Temic microelectronic GmbH, Nuremberg (DE)

(72) Inventors: Erwin Kraft, Frankfurt (DE); Nicolai Harich, Mainz (DE); Sascha Semmler, Ulm (DE); Pia Dreiseitel, Eschborn (DE)

(73) Assignee: Conti Temic Microelectronic GmbH

( * ) Notice: Subject to any disclaimer, the term of this patent is extended or adjusted under 35 U.S.C. 154(b) by 108 days.

(21) Appl. No.: 16/641,828

(22) PCT Filed: Sep. 10, 2018

(86) PCT No.: PCT/DE2018/200085
§ 371 (c)(1),
(2) Date: Feb. 25, 2020

(87) PCT Pub. No.: WO2019/048011
PCT Pub. Date: Mar. 14, 2019

(65) Prior Publication Data
US 2020/0394393 A1 Dec. 17, 2020

(30) Foreign Application Priority Data
Sep. 11, 2017 (DE) .................... 10 2017 216 000.4

(51) Int. Cl.
*G06V 40/10* (2022.01)
*G06V 40/20* (2022.01)
(Continued)

(52) U.S. Cl.
CPC .......... *G06V 40/20* (2022.01); *G06K 9/6218* (2013.01); *G06K 9/6269* (2013.01); *G06V 20/58* (2022.01); *G06V 40/10* (2022.01)

(58) Field of Classification Search
CPC .......... G06K 9/00335; G06K 9/00362; G06K 9/00805; G06K 9/6218; G06K 9/6269;
(Continued)

(56) References Cited

U.S. PATENT DOCUMENTS 7,308,112 B2 12/2007 Fujimura et al.
8,954,252 B1 2/2015 Urmson et al.
(Continued)

FOREIGN PATENT DOCUMENTS

CN 101789125 A * 7/2010
CN 104899927 A * 9/2015
(Continued)

OTHER PUBLICATIONS

Solomon, Cleshain, and Zenghui Wang. "Driver Attention and Behavior Detection with Kinect." J. Image Graph 3, No. 2 (2015): 84-89. (Year: 2015).*
(Continued)

*Primary Examiner* — Carol Wang
(74) *Attorney, Agent, or Firm* — RatnerPrestia

(57) ABSTRACT

A method of recognizing gestures of a person from at least one image from a monocular camera, e.g. a vehicle camera, includes comp the steps:
a) detecting key points of the person in the at least one image,
b) connecting the key points to form a skeleton-like representation of body parts of the person, wherein the skeleton-like representation represents a relative position and a relative orientation of the respective body parts of the person,
(Continued)

c) recognizing a gesture of the person from the skeleton-like representation of the person, and d) outputting a signal indicating the gesture.

18 Claims, 2 Drawing Sheets

(51) Int. Cl.
*G06K 9/62* (2022.01)
*G06V 20/58* (2022.01)

(58) Field of Classification Search
CPC ........... G06K 9/00369; G06K 9/00389; G06K 9/00791; G06K 9/00355; G06K 9/481; G06K 2209/055; G06V 40/20; G06V 40/10; G06V 40/103; G06V 40/113; G06V 40/28; G06V 20/58; G06V 20/56; G06V 10/469; G06V 2201/033

See application file for complete search history.

(56) References Cited

U.S. PATENT DOCUMENTS

| | | | |
|---|---|---|---|
| 9,460,343 B2 | 10/2016 | Suerth et al. | |
| 9,606,647 B1* | 3/2017 | Spencer-Harper | G06F 3/011 |
| 9,983,591 B2 | 5/2018 | Micks et al. | |
| 10,083,233 B2* | 9/2018 | Kontschieder | G06N 20/10 |
| 10,296,102 B1* | 5/2019 | Misra | G06K 9/2054 |
| 10,579,869 B1* | 3/2020 | Xiong | G06N 20/10 |
| 2010/0194872 A1* | 8/2010 | Mathe | G06F 3/011 |
| | | | 348/E7.085 |
| 2010/0303289 A1* | 12/2010 | Polzin | A63F 13/428 |
| | | | 348/135 |
| 2010/0303302 A1* | 12/2010 | Kipman | G06K 9/00369 |
| | | | 382/107 |
| 2010/0325590 A1* | 12/2010 | Homma | G06F 3/011 |
| | | | 715/863 |
| 2011/0093820 A1* | 4/2011 | Zhang | A63F 13/77 |
| | | | 715/863 |
| 2011/0296505 A1* | 12/2011 | Perez | G06F 21/32 |
| | | | 715/728 |
| 2011/0298827 A1* | 12/2011 | Perez | G06K 9/00355 |
| | | | 345/647 |
| 2011/0317871 A1* | 12/2011 | Tossell | G06K 9/00369 |
| | | | 382/103 |
| 2012/0150650 A1* | 6/2012 | Zahand | G06Q 30/0251 |
| | | | 705/14.66 |
| 2012/0162065 A1 | 6/2012 | Tossell et al. | |
| 2012/0309516 A1* | 12/2012 | Langridge | G06F 3/017 |
| | | | 463/31 |
| 2013/0230211 A1 | 9/2013 | Tanabiki et al. | |
| 2013/0278501 A1* | 10/2013 | Bulzacki | G06K 9/627 |
| | | | 345/157 |
| 2014/0062862 A1 | 3/2014 | Yamashita | |
| 2014/0104168 A1* | 4/2014 | Hegde | G06F 3/033 |
| | | | 345/157 |
| 2015/0035750 A1* | 2/2015 | Bailey | G06V 40/20 |
| | | | 345/158 |
| 2016/0012301 A1 | 1/2016 | Arndt et al. | |
| 2016/0062468 A1* | 3/2016 | Livshits | G06F 3/011 |
| | | | 345/156 |
| 2018/0047175 A1* | 2/2018 | Wang | G06V 10/255 |
| 2019/0258058 A1* | 8/2019 | Fortin-Desch | G06F 3/011 |

FOREIGN PATENT DOCUMENTS

| | | |
|---|---|---|
| DE | 102013207223 | 10/2014 |
| DE | 102014207802 | 10/2015 |
| DE | 102016120508 | 5/2017 |
| JP | 2005165422 A | 6/2005 |
| JP | 2007538318 A | 12/2007 |
| JP | 2013535717 A | 9/2013 |
| JP | 2014048936 A | 3/2014 |
| JP | 2015116308 A | 6/2015 |
| JP | 2017010560 A | 1/2017 |
| KR | 101625259 B1 * | 5/2016 |
| WO | WO-2011110727 A1 * | 9/2011 ........... G06F 3/0346 |

OTHER PUBLICATIONS

Miranda, Leandro, Thales Vieira, Dimas Martinez, Thomas Lewiner, Antonio W. Vieira, and Mario FM Campos. "Real-time gesture recognition from depth data through key poses learning and decision forests." In 2012 25th SIBGRAPI Conference on Graphics, Patterns and Images, pp. 268-275. IEEE, 2012. (Year: 2012).*

Rangesh, Akshay, Eshed Ohn-Bar, Kevan Yuen, and Mohan M. Trivedi. "Pedestrians and their phones-detecting phone-based activities of pedestrians for autonomous vehicles." In 2016 IEEE 19th International Conference on Intelligent Transportation Systems (ITSC), pp. 1882-1887. IEEE, 2016. (Year: 2016).*

Pohl, Jochen, Wolfgang Birk, and Lena Westervall. "A driver-distraction-based lane-keeping assistance system." Proceedings of the Institution of Mechanical Engineers, Part I: Journal of Systems and Control Engineering 221, No. 4 (2007): 541-552. (Year: 2007).*

Fletcher, Luke, and Alexander Zelinsky. "Driver inattention detection based on eye gaze—Road event correlation." The international journal of robotics research 28, No. 6 (2009): 774-801. (Year: 2009).*

Ionescu, Bogdan, Didier Coquin, Patrick Lambert, and Vasile Buzuloiu. "Dynamic hand gesture recognition using the skeleton of the hand." EURASIP Journal on Advances in Signal Processing 2005, No. 13 (2005): 1-9. (Year: 2005).*

Asteriadis, Stylianos, Paraskevi Tzouveli, Kostas Karpouzis, and Stefanos Kollias. "Estimation of behavioral user state based on eye gaze and head pose—application in an e-learning environment." Multimedia Tools and Applications 41, No. 3 (2009): 469-493. (Year: 2009).*

Bhuyan, Manas Kamal, Karl F. MacDorman, Mithun Kumar Kar, Debanga Raj Neog, Brian C. Lovell, and Prathik Gadde. "Hand pose recognition from monocular images by geometrical and texture analysis." Journal of Visual Languages & Computing 28 (2015): 39-55. (Year: 2015).*

Qiao, Sen, Yilin Wang, and Jian Li. "Real-time human gesture grading based on OpenPose." In 2017 10th International Congress on Image and Signal Processing, BioMedical Engineering and Informatics (CISP-BMEI), pp. 1-6. IEEE, 2017. (Year: 2017).*

Translated version of CN101789125 (Year: 2010).*
Translated version of CN104899927 (Year: 2015).*

Tellaeche, Alberto, Johan Kildal, and Inaki Maurtua. "A flexible system for gesture based human-robot interaction." Procedia CIRP 72 (2018): 57-62. (Year: 2018).*

Yang, Hee-Deok, A-Yeon Park, and Seong-Whan Lee. "Gesture spotting and recognition for human-robot interaction." IEEE Transactions on robotics 23, No. 2 (2007): 256-270. (Year: 2007).*

English translation of the International Search Report of the International Searching Authority for International Application PCT/DE2018/200085, dated Nov. 22, 2018, 3 pages, European Patent Office, HV Rijswijk, Netherlands.

PCT International Preliminary Report on Patentability including English Translation of PCT Written Opinion of the International Searching Authority for International Application PCT/DE2018/200085, dated Mar. 17, 2020, 6 pages, International Bureau of WIPO, Geneva, Switzerland.

German Search Report for German Patent Application No. 10 2017 216 000.4, dated Feb. 26, 2018, 9 pages, German Patent and Trademark Office, Muenchen, Germany, with partial English translation, 8 pages.

Federica Bogo et al., "Keep it SMPL: Automatic Estimation of 3D Human Pose and Shape from a Single Image", International Conference on Simulation, Modeling, and Programming for Autonomous Robots, SIMPAR 2010; Springer, Berlin, Heidelberg, Sep. 16, 2016, XP047355099, ISBN: 978-3-642-17318-9, pp. 561 to 578.

Xiaowei Zhou et al., "Sparseness Meets Deepness: 3D Human Pose Estimation from Monocular Video", 2016 IEEE Conference on

(56) References Cited

OTHER PUBLICATIONS

Computer Vision and Pattern Recognition (CVPR), Jun. 27, 2016, XP033021690, pp. 4966 to 4975, retrieved from arXiv: 1511.09439v2 [cs.CV] Apr. 28, 2016.
Zhe Cao et al., "Realtime Multi-Person 2D·Pose Estimation using Part Affinity Fields", https://arxiv.org/pdf/1611.08050.pdf, arXiv:1611.08050v2 [cs.CV] Apr. 14, 2017, retrieved on Sep. 11, 2017, 9 pages.
Japanese Notice of Reasons for Refusal for Japanese Application No. 2020-505212, dated Jun. 21, 2022 with translation, 8 pages.

\* cited by examiner

GESTURE CONTROL FOR COMMUNICATION WITH AN AUTONOMOUS VEHICLE ON THE BASIS OF A SIMPLE 2D CAMERA

FIELD OF THE INVENTION

The invention relates to a method and a device for recognizing gestures by means of a monocular camera and can be used in particular in vehicle cameras of a partly autonomously driven vehicle.

BACKGROUND INFORMATION

The prior art for detecting gestures includes, for example, the 3D camera Kinect. 3D information (e.g. Kinect) which makes it possible to recognize gestures is needed for most of the known methods or respectively systems.

The publication "Realtime Multi-Person 2D Pose Estimation using Part Affinity Fields" by Cao et al. (https://arxiv.org/pdf/1611.08050.pdf, retrieved on Nov. 9, 2017) shows a method for 2D pose estimation of multiple persons in one image. During this, body parts which belong to a person are connected to one another in a skeleton-like manner. A list of key points is compiled therewith, by means of which the connected components of the endoskeleton are drawn up.

DE 10 2014 207 802 B3 shows a method and a system for proactively detecting an action of a road user in traffic. A pixelated structured image of the road user (e.g. pedestrian) is captured by means of at least one camera and corresponding image data are generated. Image data of multiple pixels are, in each cell, grouped in cells, wherein the image comprises multiple cells. In each case, a focal point is determined on the basis of the image data within a cell. For each of the pixels, the distance from the focal points of a plurality of the cells is established in each case, wherein on the basis of coordinates of the respective pixel and the focal points, a property vector assigned to the pixel is formed. The property vector is compared with at least one reference vector cluster and, based on the comparison, a pose is assigned to the road user, which pose is representative of the fact that the road user will carry out the action. With this method, it is assumed that, on the basis of poses of a road user, the latter's intention (e.g. intention to cross at the crosswalk) can already be recognized prior to the road user carrying out the actual action. On the basis of said pose recognition, it is then likewise possible to take proactive measures prior to the action occurring such as, for example, outputting an acoustic and/or visual warning to the driver and/or to the road user captured by the measuring technology, and/or making a controlling intervention in a vehicle system such as, for example, in the brakes or in the steering.

A skeleton-like, simplified schematic representation of the road user or respectively pedestrian can, for example, be assigned to a pose. The pose can, in turn, be assigned to an action of the road user which is to be expected, on the basis of which a traffic situation can be evaluated, a possible risk can be deduced and, if possible, further control measures can be wholly or partly automatically initiated. For example, a partly stooped pose, in which a person typically starts running, can be assigned to a risk in road traffic if the pose is captured in an alignment "from the front", i.e. the person is moving towards the vehicle.

The disadvantage of this approach is that forming the property vectors is an elaborate process.

SUMMARY OF THE INVENTION

One problem which is to be solved with respect to the prior art is an improved gesture recognition based on images from a monocular camera in the vehicle, upon which a control of vehicle functions can build.

Aspects of the invention relate, for example, to:
- a gesture control for instructing a vehicle e.g. a police officer at an intersection (right hand indicates a right turn)
- a gesture control for communication with an autonomous vehicle on the basis of a simple 2D camera
- checking the attention of road users (pedestrians who are distracted, for example, by smartphones)

It is in particular the purpose of the gesture or respectively pose recognition to analyze static poses (gestures) of a person. It is therefore possible, for example, to recognize whether a person is lifting his/her left or right arm or stretching out both arms.

The above problem can be solved by a method and a device according to the invention, having features as set forth herein.

The approach to solving said problem is based on describing various gestures, on the basis of a skeleton representation, making this accessible to a classifier and subsequently recognizing said gestures in images of persons.

The skeleton representation of a person depicted in a camera image can in particular be based on semantically assigned object parts, e.g. body parts of a person.

A method according to the invention for recognizing gestures of a person from at least one image from a monocular camera comprises the steps:
a) detecting key points of a person in the at least one image from the monocular camera,
b) connecting key points to a skeleton-like representation of parts of the person, wherein the skeleton-like representation reflects the relative position and orientation of individual body parts of the person,
c) recognizing a gesture from the skeleton-like representation of the person, and
d) outputting the gesture recognized.

To this end, following the detection of key points and the combination thereof into skeletons, a list of connected body parts, e.g. in the form of a table, is provided. These can be complete, but also incomplete (half-concealed person). Body parts can thus also be missing.

The skeleton-like representation reflects the relative position and orientation of individual body parts of the person, e.g. in the form of a list of the key points which are connected to one another including the position thereof.

The various key points of a person are consequently converted into a robust representation.

To this end, various body parts are preferably divided up into groups (e.g. upper body with arms, head with left arm, head with right arm, head alone). This redundant division makes the method very stable with respect to partial concealments of the person (person behind car shown only as an upper body, person behind an advertising pillar shown as half a person vertically).

Groups (of key points connected to one another) are preferably formed from one or more related body parts. A group corresponds to a partial pose of the person or respectively a part of a gesture adopted by the person.

A body part advantageously belongs to multiple groups, e.g. a first partial pose can contain the head and the left arm and a second partial pose can contain the head and the right arm.

The number of the groups or respectively partial poses is a free parameter which can be variably adjusted.

The coding of the key points is ideally converted into a compact, semantically interpretable feature space which is analyzed e.g. via a deep neural network. In other words, a feature vector can be assigned to each group or respectively partial pose. The feature vectors are based, for example, on the coordinates of the key points which are combined in said group.

The feature vectors of the groups or respectively partial poses are preferably merged with the aid of a clustered pose directory (a pose dictionary) by an aggregation method to produce a final feature vector.

During said aggregation, e.g. a histogram can be produced regarding the pose directory or added-up differences between the individual cluster centers of the pose directory can be formed. The pose directory itself can be produced with a clustering method, e.g. kNN clustering, that is to say clustering taking account of the k next neighbors, or GMM clustering, that is to say clustering by means of Gaussian mixture models.

The final feature vector (composed of the feature vectors of the partial poses) is preferably utilized for classifying the pose/gesture.

The viewing direction of the person is preferably estimated based on the skeleton-like representation.

It can preferably be checked whether the viewing direction of the person is directed towards the monocular camera.

The gesture is advantageously recognized by a gesture classification which has previously been trained. A suitable classification method which is known per se can be deployed as the classification method, e.g. SVM (Support Vector Machines) or deep neural networks.

The number of key points which are assigned to a person is preferably a maximum of 20.

A person who has lowered his/her head and who is looking at his/her hand is preferably classified as a distracted road user.

Based on the gesture recognition, a gesture control for communication with an autonomous vehicle can be installed. In order to communicate, e.g. with the vehicle owner or a future passenger of an autonomously driven taxi, feedback on the part of the vehicle is required, so that the person knows that s/he has been seen or respectively understood. In this way, an interaction between the vehicle and the person is possible. However, in the case of warnings as well, if a person is walking on the road and a collision with the vehicle is imminent, it can be helpful if the vehicle provides the person with an acknowledgement that the vehicle has perceived the person and a collision is avoided.

A further subject-matter of the invention is a corresponding device for recognizing gestures of a person from images from a monocular camera. The device is configured
a) to detect key points of a person in the at least one image from the monocular camera,
b) to connect key points to a skeleton-like representation of parts of the person, wherein the skeleton-like representation reflects the relative position and orientation of individual body parts of the person,
c) to recognize a gesture from the skeleton-like representation of the person, and
d) to produce and output an output signal representing the recognized gesture.

The device can in particular comprise a microcontroller or microprocessor, a digital signal processor (DSP), an ASIC (application-specific integrated circuit), a FPGA (field-programmable gate array) and more of the same as well as software for performing the appropriate method steps. The present invention can consequently be implemented in digital electronic circuits, computer hardware, firmware or software.

The device can in particular be arranged and operated together with a monocular camera, e.g. a front camera, reversing camera or side camera in a vehicle.

Furthermore, the invention relates to a vehicle having a monocular camera and a device according to the invention.

BRIEF DESCRIPTION OF THE DRAWINGS

Exemplary embodiments and figures are explained in greater detail below.

DETAILED DESCRIPTION OF EXAMPLE EMBODIMENTS OF THE INVENTION

To this end, an exemplary embodiment of the gesture recognition utilizes a two-step approach:
1. Detection of the Person The persons in the image are first detected. A person detector is deployed for this. A special detector is advantageously used, which finds the individual body parts of a person and connects these to produce a skeleton.

Figure 1:
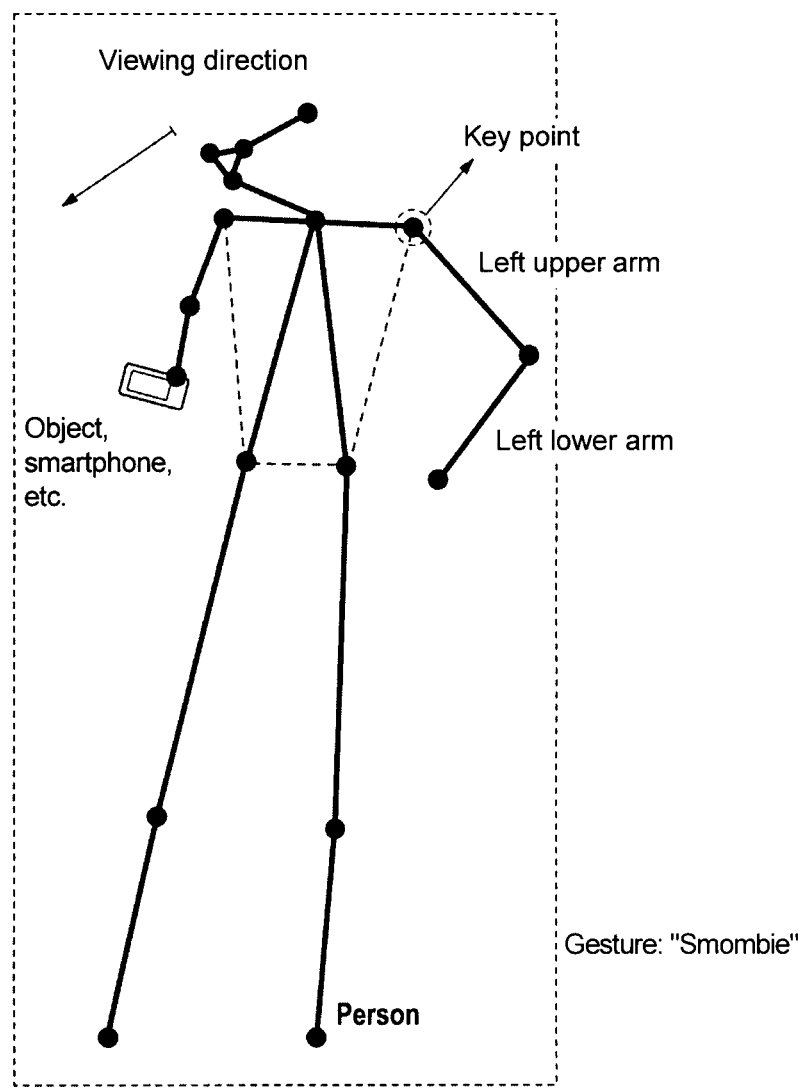
FIG. 1 is a schematic illustration of a skeleton representation of a person imaged by a monocular camera.

FIG. 1 illustrates, by way of example, a skeleton representation of a real person who has been depicted by a vehicle camera. Key points have been extracted from the image of the vehicle camera and the connection of the key points established. Key points are e.g. shoulders, neck, elbows, hands/wrists, hips, knees, ankles; mouth, right and left eye and the apex of the head.

The key points are connected to one another by straight lines in such a way that they result in a skeleton-like representation. For example, the key points of the left wrist and elbow of the person are connected to one another to form the "left lower arm" and the left shoulder (marked "key point" in the figure) is connected to the left elbow to form the "left upper arm".

The key points can be clustered e.g. by means of a "Gaussian mixture model" and the parts of the person can be converted into a Fisher vector representation. A Fisher vector therefore only encodes information of an individual person. Overlapping persons are therefore excluded.

The various parts of the relevant person are divided up by means of a table into groups of actions, as they are advantageous for a particular gesture. Said table can also be trained by means of a training method. In a simple case (distinguishing of relatively few gestures), the table can be established by hand if the poses can be very clearly assigned to various body regions.

The viewing direction of the person can be estimated on the basis of the key points in the head region of the person. The viewing direction is lowered and points in the direction of the person's right hand.

The gesture recognition recognizes from this that the person is presumably looking at an object in his/her hand and is not currently paying any attention to the traffic. Due to the assumption that the person is looking at his/her smartphone, this gesture is classified as "smombie" (smartphone zombie). This information is transmitted by the gesture recognition to a further control device of the vehicle. An autonomously driven vehicle can then take account, during its travel planning, of the fact that said pedestrian is not paying attention and/or can output a warning to the pedestrian if s/he should be at risk.

2. Classification of the Gesture or Respectively Pose

Feature vectors based on the coordinates of the skeleton connecting points (key points, joints) are produced for each person.

Figure 2:
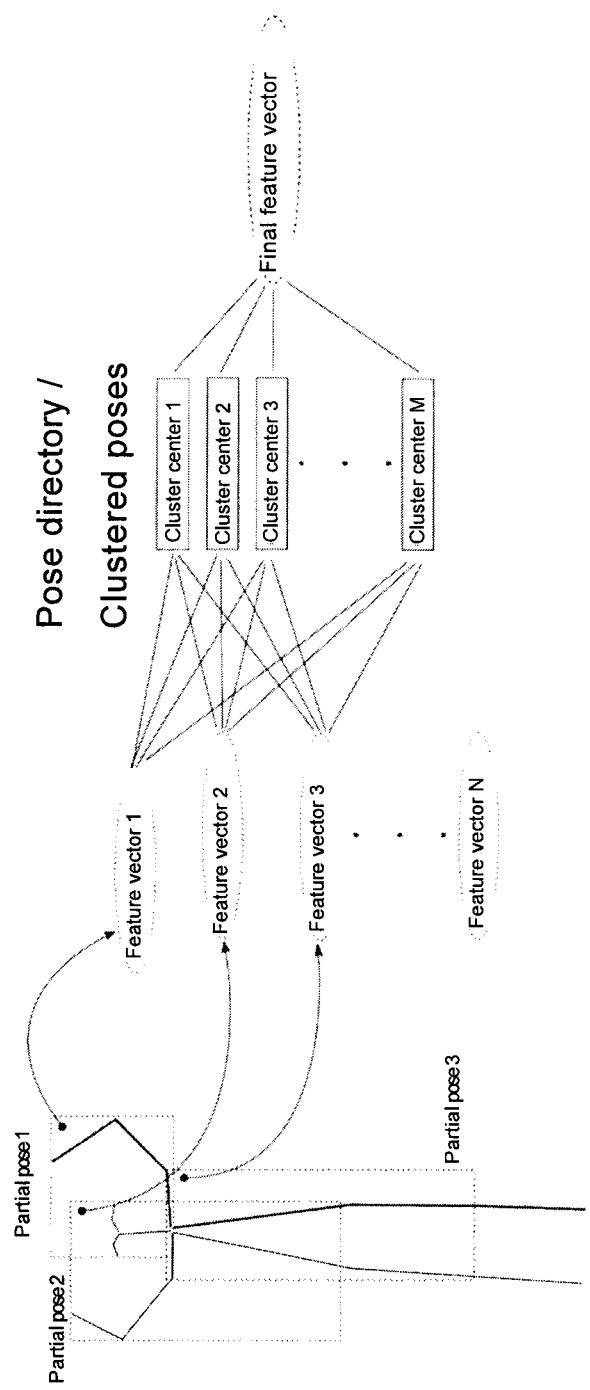
FIG. 2 is a schematic diagram representing a procedure for classifying gestures based on the skeleton representation.

FIG. 2 illustrates the procedure for classifying gestures: Not only one feature vector is used for each person, as is conventionally the case. Instead, a quantity of N feature vectors is produced for each person, which are based on different partial poses. One of these partial poses can e.g. include only the head and the left arm, another can include the head and the right arm. The number N of these partial poses is a free parameter which can be variably adjusted. The feature vectors of the partial poses are merged by an aggregation method with the aid of a clustered pose directory (pose dictionary) to produce a final feature vector. During said aggregation, e.g. a histogram regarding the pose directory can be produced or added-up differences between the M cluster centers of the pose directory can be formed. The pose directory itself is produced with a clustering method (e.g. kNN clustering, that is to say clustering, taking account of the k next neighbors, or GMM clustering, that is to say clustering by means of Gaussian mixture models).

The final feature vector (composed of the feature vectors of the partial poses) is utilized to classify the pose/gesture. Any classification method, e.g. SVMs (Support Vector Machines) or deep neural networks can be utilized to this end.

FIG. 2 shows, by way of example, how feature vectors of the partial poses are merged by an aggregation method with the aid of a clustered pose directory (pose dictionary) to produce a final feature vector.

On the left side, a skeleton representation comparable to that represented in FIG. 1 can be seen. Drawn-through straight lines represent the connection between, in each case, two related key points, that is to say the "bones" of the skeleton. The skeleton representation of the entire person is broken down into multiple partial poses 1, 2, 3, . . . , N, wherein the first three partial poses are represented on the left in FIG. 2 as dashed rectangles. Here, partial pose 1 contains e.g. the head and the left arm of the person. Partial pose 2 likewise contains the head, the right arm and the upper body of the person. In partial pose 3, the right and left upper arm, upper body and thigh are contained. A corresponding feature vector is assigned to each partial pose. Each feature vector is transmitted to a (or respectively each) cluster center 1, 2, 3, . . . , M of the pose directory. Finally, the pose directory outputs a final feature vector which is utilized to classify the pose or respectively the gesture of the person.

In a further exemplary embodiment, it is recognized by means of gesture recognition from a sequence of images that a person is waving in the surroundings of the vehicle, on the basis of a corresponding movement of a lower arm in the skeleton-like representation. The vehicle having the camera and the gesture recognition is, in this example, an autonomously driven taxi. In the case of said gestures, it is important to decide whether the pedestrian's gesture is meant for the taxi. Here as well, it is expedient to consider the estimation of the viewing direction. Otherwise, it can happen that the taxi stops in order to allow the pedestrian to get in, although the latter was waving to another pedestrian. Or it can happen that the pedestrian was flagging an autonomous taxi which was driving in front and then both taxis stop.

The invention claimed is:

1. A method comprising the steps:
   a) detecting key points of body parts of a person in at least one 2D image from a monocular vehicle camera mounted on a vehicle,
   b) connecting the key points to form a skeleton-like representation of the body parts of the person, wherein the skeleton-like representation represents a relative position and a relative orientation of respective individual ones of the body parts of the person,
   c) forming a first group of a first subset of the body parts, and forming a second group of a second subset of the body parts, wherein the first subset and the second subset include different body parts,
   d) determining a first partial gesture of the person based on the first subset and generating a first feature vector based on the first partial gesture, determining a second partial gesture of the person based on the second subset and generating a second feature vector based on the second partial gesture, and
   e) recognizing a final gesture of the person based on a final feature vector generated by merging the first feature vector and the second feature vector, wherein the detecting of the key points, the connecting of the key points, and the recognizing of the final gesture is performed based on 2D information from the at least one 2D image without any depth information,
   f) producing a signal indicating the final gesture, and
   g) actuating a control system of the vehicle or outputting a humanly perceivable information signal from the vehicle, automatically in response to and dependent on the signal indicating the final gesture.

2. The method according to claim 1, wherein at least one of the body parts belongs to more than one of the groups.

3. The method according to claim 1, wherein the partial gestures are static gestures, and further comprising adjusting a number of the groups.

4. The method according to claim 1, further comprising assigning a respective feature vector respectively to each one of the groups, wherein the forming of the groups comprises combining the key points associated with the related ones of the body parts respectively in each respective one of the groups, and wherein said feature vector of a respective one of the groups is based on coordinates of the key points which are combined in the respective group.

5. The method according to claim 1, wherein the recognizing of the final gesture is based on classifying the final feature vector.

6. The method according to claim 5, wherein at least one of the body parts belongs to more than one of the groups.

7. The method according to claim 1, further comprising estimating a viewing direction of the person based on the skeleton-like representation.

8. The method according to claim 7, further comprising checking whether the viewing direction of the person is directed toward the monocular vehicle camera.

9. The method according to claim 7, further comprising classifying the person as a distracted road user when the final gesture and the viewing direction indicate that the person has lowered his or her head and is looking at his or her hand.

10. The method according to claim 1, wherein the recognizing of the final gesture is based on a gesture classification which has previously been trained.

11. The method according to claim 1, wherein a number of the key points of the body parts of the person is a maximum of 20.

12. The method according to claim 1, wherein the step g) comprises the actuating of the control system of the vehicle automatically in response to and dependent on the signal indicating the final gesture.

13. The method according to claim 1, wherein the step g) comprises the outputting of the humanly perceivable information signal, which communicates, from the vehicle to the person, a warning or an acknowledgment indicating that the person has been detected, automatically in response to and dependent on the signal indicating the final gesture.

14. The method according to claim 1, wherein the partial gestures are static gestures.

15. The method according to claim 1, wherein the at least one image is a single still monocular image.

16. The method according to claim 1, wherein the body parts of the person include at least one body part selected from the group consisting of an upper body, shoulders, upper arms, elbows, legs, thighs, hips, knees, and ankles.

17. A device configured:
a) to detect key points of body parts of a person in at least one 2D image from a monocular vehicle camera mounted on a vehicle,
b) to connect the key points to form a skeleton-like representation of the body parts of the person, wherein the skeleton-like representation represents a relative position and a relative orientation of respective individual ones of the body parts of the person,
c) to form a first group of a first subset of the body parts, and to form a second group of a second subset of the body parts, wherein the first subset and the second subset include different body parts,
d) to determine a first partial gesture of the person based on the first subset and generating a first feature vector based on the first partial gesture, to determine a second partial gesture of the person based on the second subset and generate a second feature vector based on the second partial gesture, and
e) to recognize a final gesture of the person based on a final feature vector generated by merging the first feature vector and the second feature vector, wherein the detecting of the key points, the connecting of the key points, and the recognizing of the final gesture is performed based on 2D information from the at least one 2D image without any depth information,
f) to produce a signal indicating the final gesture, and
g) to actuate a control system of the vehicle or to output a humanly perceivable information signal from the vehicle, automatically in response to and dependent on the signal indicating the final gesture.

18. A vehicle having a monocular vehicle camera and a device according to claim 17.

* * * * *